(12) United States Patent
Kim et al.

(10) Patent No.: US 9,081,134 B2
(45) Date of Patent: Jul. 14, 2015

(54) SUBSTRATE HAVING LOW REFLECTION AND HIGH CONTACT ANGLE, AND PRODUCTION METHOD FOR SAME

(75) Inventors: Tae-Su Kim, Daejeon (KR); Jae-Jin Kim, Seoul (KR); Bu-Gon Shin, Daejeon (KR); Young-Jun Hong, Daejeon (KR); Hyeon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 382 days.

(21) Appl. No.: 13/504,444

(22) PCT Filed: Oct. 28, 2010

(86) PCT No.: PCT/KR2010/007457
§ 371 (c)(1),
(2), (4) Date: Apr. 26, 2012

(87) PCT Pub. No.: WO2011/053004
PCT Pub. Date: May 5, 2011

(65) Prior Publication Data
US 2012/0212816 A1 Aug. 23, 2012

(30) Foreign Application Priority Data
Oct. 29, 2009 (KR) .................. 10-2009-0103694

(51) Int. Cl.
*G02B 5/30* (2006.01)
*G02B 1/118* (2015.01)
*G02B 1/10* (2015.01)

(52) U.S. Cl.
CPC ............... *G02B 1/118* (2013.01); *G02B 1/105* (2013.01); *Y10T 428/24612* (2015.01)

(58) Field of Classification Search
CPC .......... G02B 1/118; G02B 1/105; G02B 5/30; G03F 7/20; B44C 1/17; B32B 3/14; B05D 5/06; Y10T 428/24612
USPC .............................. 359/485.01, 507, 512, 601
See application file for complete search history.

(56) References Cited

U.S. PATENT DOCUMENTS

| | | | |
|---|---|---|---|
| 5,742,118 A * | 4/1998 | Endo et al. ................... 313/479 |
| 5,916,735 A | 6/1999 | Nakashima et al. | |
| 6,210,750 B1 | 4/2001 | Cho et al. | |
| 6,586,522 B1 | 7/2003 | Jariwala et al. | |
| 7,239,444 B2 * | 7/2007 | Mizuno et al. ................ 359/443 |
| 7,858,010 B2 * | 12/2010 | Cho et al. ....................... 264/220 |
| 2006/0146306 A1 * | 7/2006 | Nagasaka et al. .............. 355/53 |

(Continued)

FOREIGN PATENT DOCUMENTS

| | | |
|---|---|---|
| CN | 101178442 A | 5/2008 |
| DE | 102007009512 A1 | 8/2008 |

(Continued)

*Primary Examiner* — Frank Font
(74) *Attorney, Agent, or Firm* — McKenna Long & Aldridge LLP

(57) ABSTRACT

Provided are a substrate including a base with a pattern on at least one side thereof, in which a refractive index in a lower region of the pattern and a refractive index in an upper region of the pattern are different from each other according to a shape of the pattern; and a water repellent coating layer provided on at least one side with the pattern of the base, an optical product including the same, and a manufacturing method of the substrate. The substrate according to the present invention has both an excellent anti-reflective property and an excellent water repellent property.

16 Claims, 4 Drawing Sheets

(56) References Cited

U.S. PATENT DOCUMENTS

| | | | |
|---|---|---|---|
| 2006/0284554 A1* | 12/2006 | Yotsuya | 313/506 |
| 2008/0107868 A1 | 5/2008 | Kuroda et al. | |
| 2008/0292787 A1* | 11/2008 | Kim et al. | 427/164 |
| 2010/0033819 A1 | 2/2010 | Schulz et al. | |
| 2014/0307238 A1* | 10/2014 | Kohno et al. | 355/30 |

FOREIGN PATENT DOCUMENTS

| | | |
|---|---|---|
| EP | 1921470 A2 | 5/2008 |
| JP | 10-152797 A | 6/1998 |
| JP | 10-273617 | 10/1998 |
| JP | 10-273617 A | 10/1998 |
| JP | 2003-172808 A | 6/2003 |
| JP | 2004219626 A | 8/2004 |
| JP | 2006098489 A | 4/2006 |
| JP | 2007187868 A | 7/2007 |
| KR | 10-1999-003633 | 1/1999 |
| KR | 10-1999-0003633 A | 1/1999 |
| KR | 10-2003-0011885 A | 2/2003 |
| WO | 2008104150 A1 | 9/2008 |

\* cited by examiner

EXAMPLE 1   COMPARATIVE EXMAPLE 1

Figure 5

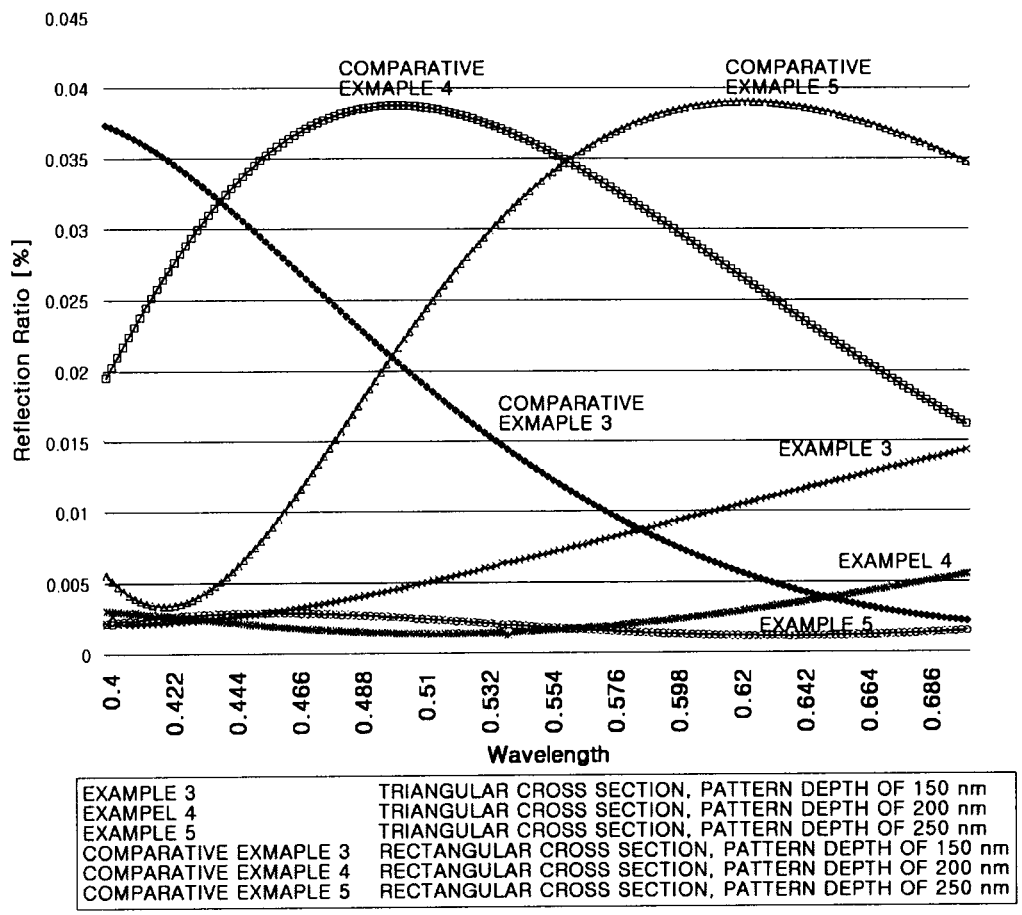

| EXAMPLE 3 | TRIANGULAR CROSS SECTION, PATTERN DEPTH OF 150 nm |
| EXAMPEL 4 | TRIANGULAR CROSS SECTION, PATTERN DEPTH OF 200 nm |
| EXAMPLE 5 | TRIANGULAR CROSS SECTION, PATTERN DEPTH OF 250 nm |
| COMPARATIVE EXMAPLE 3 | RECTANGULAR CROSS SECTION, PATTERN DEPTH OF 150 nm |
| COMPARATIVE EXMAPLE 4 | RECTANGULAR CROSS SECTION, PATTERN DEPTH OF 200 nm |
| COMPARATIVE EXMAPLE 5 | RECTANGULAR CROSS SECTION, PATTERN DEPTH OF 250 nm |

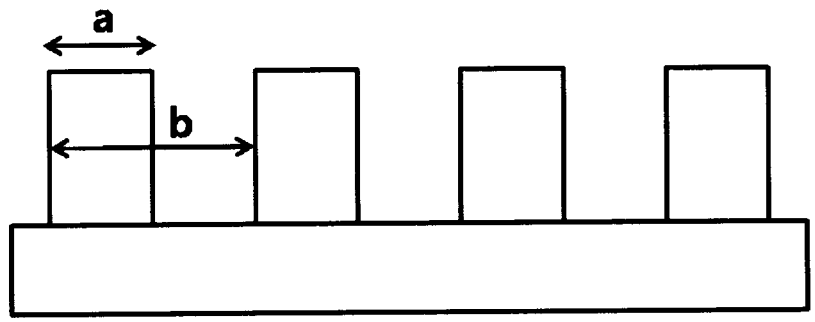

SUBSTRATE HAVING LOW REFLECTION AND HIGH CONTACT ANGLE, AND PRODUCTION METHOD FOR SAME

This application is a national stage application of PCT/KR2010/007457, filed Oct. 28, 2010, which claims priority from Korean Patent Application No. 10-2009-0103694, filed on Oct. 29, 2009 with the Korean Patent Office, both of which are incorporated by reference herein in their entirety.

TECHNICAL FIELD

The present invention relates to a substrate having low reflection and a high contact angle and a manufacturing method thereof.

BACKGROUND ART

In general, optical products provide clearly-reflected images such as goest and flare, but do not provide clear visibility. Accordingly, an anti-reflective layer is formed on a substrate in order to acquire the clearly-reflected image and the clear visibility. The anti-reflective layer is generally made of silicon oxide or magnesium fluoride having high hardness and a low refractive index.

However, when the optical products, of which the anti-reflective layer made of silicon oxide or magnesium fluoride is included on the surface, are cleaned with water but not sufficiently wiped and left as it is for drying, the anti-reflective layer is stained with spots such as water left on the surface, so called a "water stain" and as a result, visibility is deteriorated. In order to prevent the spot, water repellent processing may be performed on the surface of anti-reflective layer with curable polysiloxane, a silane compound having a water repellent property, and the like.

As described above, the optical product having both anti-reflection and water repellency is generally manufactured by coating a refractive index matching material for an anti-reflective property and coating a water repellent material for a water repellent property, on a flat base.

However, in order to acquire both the anti-reflective property and the water repellent property, a plurality of thin film layers having the anti-reflective property and the water repellent property need to be repetitively coated and although the water repellent material is coated on the anti-reflective layer, it is difficult to acquire a substrate having a contact angle of 120° or more. Further, in order to reduce reflection in a wide wavelength area, a multi-coating method which performs anti-reflective coating several times needs to be used, but this is an important factor of increase in a product cost due to increase in a coating cost.

DETAILED DESCRIPTION OF THE INVENTION

Technical Problem

The present invention has been made in an effort to provide a substrate of which both an anti-reflective property and a water repellent property are excellent and a manufacturing process is easy and an optical product including the same.

Technical Solution

In order to achieve the object, an exemplary embodiment of the present invention provides a substrate, including:

1) a base with a pattern on at least one side thereof, in which a refractive index in a lower region of the pattern and a refractive index in an upper region of the pattern are different from each other according to a shape of the pattern; and 2) a water repellent coating layer provided on at least one side with the pattern of the base.

Further, another exemplary embodiment of the present invention provides a manufacturing method of a substrate, including:

a) forming a pattern having a shape so that a refractive index in a lower region of the pattern and a refractive index in an upper region of the pattern are different from each other, on at least one side of a base; and b) forming a water repellent coating layer on at least one side with the pattern of the base.

In the manufacturing method of the substrate, an interference lithography method may be used in order to form the pattern on the base in step a).

Further, yet another exemplary embodiment of the present invention provides an optical product including the substrate according to the present invention.

Advantageous Effects

According to the exemplary embodiments of the present invention, without performing coating of a plurality of thin films or forming a separate anti-reflective layer, it is possible to provide a substrate having light transmittance of less than 2% and a high contact angle of 120° or more and process efficiency thereof is excellent.

BRIEF DESCRIPTION OF DRAWINGS

FIG. 5 is a graph illustrating reflection ratio of substrates manufactured in Examples 3 to 5 and Comparative Examples 3 to 5.

BEST MODE

Hereinafter, the present invention will be described in detail.

An exemplary embodiment of the present invention includes:

1) a base with a pattern on at least one side thereof and having different refractive indexes at a lower region of the pattern and at an upper region of the pattern according to a shape of the pattern; and 2) a water repellent coating layer provided on at least one side with the pattern of the base.

In this specification, the lower region and the upper region of the pattern mean relative positions and the lower region of the pattern means a region which is close to the planar surface of the base and the upper region of the pattern means a region which is relatively far away from the planar surface of the base and close to an air layer.

In the present invention, a refractive index may be gradually changed so as to be the same as that of the base toward the lower region of the pattern by forming the pattern on the base, thereby minimizing reflection. In the present invention, a shape of the pattern on the base is controlled so that the refractive index may be changed on the surface with the pattern of the base, thereby minimizing reflection.

The reflection is caused by a difference in a refractive index between two mediums. Accordingly, in the present invention, the refractive index is changed on the surface with the pattern of the base, thereby preventing reflection without forming a separate layer. As an example, in the case of using a glass base, a structure, in which a refractive index in an interface region between the glass base and the air layer is gradually changed, is described. Ideally, since a refractive index of the air is 1 and a refractive index of the glass base is 1.5, in the case of forming the pattern of the structure shown in FIG. 1 on the glass base, the refractive index in the interface region between the glass base and the air layer may be linearly and gradually changed from 1 to 1.5 toward the base from the air layer.

Figure 1:
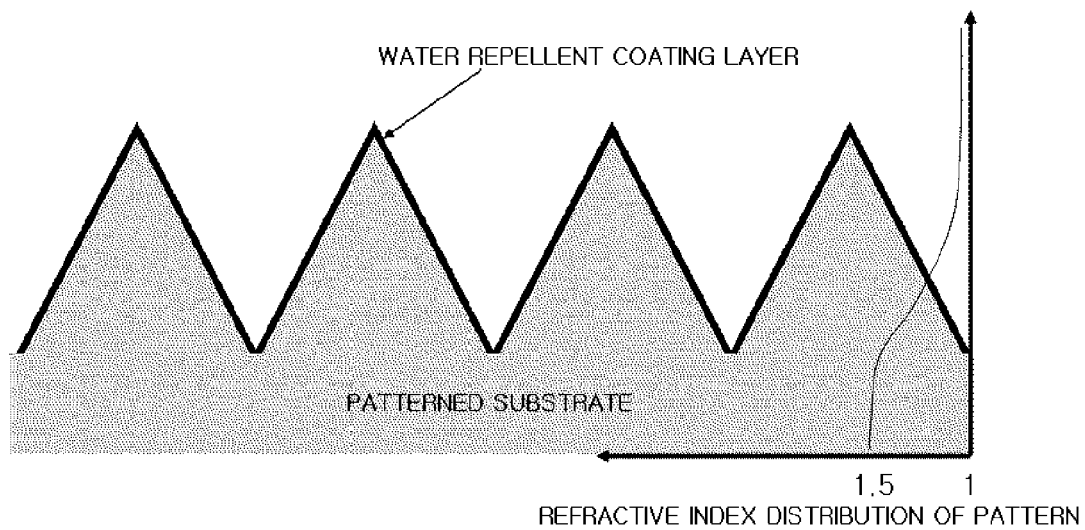
FIG. 1 is a schematic diagram illustrating change in a refractive index between a base and a water repellent coating layer in a structure of a substrate according to the present invention.

However, in the case of using a planar base and planar coating, change in the refractive index on the surface may not be acquired and there is no material having a refractive index of 1. In order to solve the problem, in the present invention, the pattern shown in FIG. 1 may be formed by changing a physical structure of the surface of the base with the water repellent coating layer. As a result, if the refractive index is virtually calculated with areas of the air layer and the base in a cross section cut in a thickness direction, that is, a vertical cross section, as shown in FIG. 1, the refractive index is gradually changed between 1 and 1.5.

The base is not particularly limited and may use plastic, metal, a silicon wafer, glass, and the like, and the thickness thereof is not limited. A preferable example of the base may include quartz glass, Pyrex glass, soda lime glass, blue glass, a cellulose triacetate film, a norbornene-based cycloolefin polymer film, a polyester film, a polymethacrylate film, a polycarbonate film, a polymethyl methacrylate (PMMA) film, or the like.

The pattern on the base may be formed by directly or indirectly using an interference lithography method. As described above, the pattern on the base is not particularly limited so long as the pattern has a form capable of changing the refractive index on the surface of the base. For example, in at least one vertical cross section, a width of the upper region may be formed to be smaller than the width of the lower region, or a horizontal cross section may be formed to be smaller toward the upper region of the pattern. In detail, the pattern on the base may be formed in a form such as one- or two-dimensional triangle, sine wave, trapezoid, and the like.

The line width and/or the pitch of the pattern on the base are(is) preferably 50 to 300 nm and more preferably 60 to 200 nm. If the line width or the pitch of the pattern is very small, efficiency in a process or feasibility is decreased and if the line width or the pitch of the pattern is very large, a rainbow occurs and thus a problem in which visibility of the substrate is deteriorated may occur.

Further, a depth of the pattern on the base, that is, a distance between a maximum point and a minimum point of the pattern is 100 nm or more and preferably 100 nm or more to 1,000 nm or less. In the case where the depth of the pattern is very small, since the depth of the pattern is much smaller than a wavelength of light, a change in a refractive index of visible light according to a change in a pattern profile becomes much smaller, such that an anti-reflective effect is low.

An aspect ratio of the pattern on the base is preferably 1 or more and more preferably 1.5 to 3. However, the aspect ratio is not limited thereto. Herein, the aspect ratio means a ratio of the depth of the pattern to the line width of the pattern. The line width of the pattern is based on a lower line width.

In order to form the pattern on the base, the interference lithography method may be used. In detail, the pattern on the base may be formed by using a direct interference lithography method. Further, before forming the pattern on the base, after a master for pattern duplication is formed by using the interference lithography method, the pattern on the base may be formed by using the master. For example, the pattern may be transferred on the substrate in a roll process by using the master as a cliché.

A wavelength of a light source used in the interference lithography process is preferably 200 to 400 nm.

In the case of using the interference lithography, a regular and fine pattern is easily formed on the base and particularly, an area ratio is gradually changed in the interface between the base and the air, such that the refractive index is gradually changed between the air and the base and thus the reflection becomes very smaller.

The water repellent coating layer provided on the surface with pattern of the base may be formed by using a water repellent material which is known in the art. For example, it is preferred that a hydrophobic layer is formed by coating one side of the base with a coating composition including at least one kind of a fluorine-based water repellent agent component and a silane-based water repellent agent component. In detail, a material such as polytetrafluoroethylene (PTFE), perfluoralkoxy (PEA), fluoroethylenepropylene (FEP), ethylenetetrafluoroethylene (ETFE), polyvinylfluoride (PVF), polychlorotrifluoroethylene (PCTFE), polydimethylsiloxane (PDMS), or the like may be used and is not limited thereto.

In order to prevent a shape change of the pattern formed on the base, a thickness of the water repellent coating layer is preferably 10 nm or less and more preferably 1 to 10 nm.

The substrate according to the present invention may have both light transmittance of less than 2% and a contact angle of 120° or more and the contact angle may also reach 150° or more.

Further, the present invention provides a method of manufacturing a substrate, including:

a) forming a pattern having a shape so that a refractive index in a lower region of the pattern and a refractive index in an upper region of the pattern are different from each other, on at least one side of a base; and b) forming a water repellent coating layer on at least one side with the pattern of the base.

Step a) may be performed by an interference lithography method and the interference lithography method may use a known method in the art.

For example, step a) includes a1) cleaning a base; a2) coating and drying an anti-reflective coating composition and a photosensitive resin composition in sequence on the base; a3) selectively exposing and developing the formed anti-reflective layer and photosensitive layer by using an interference lithography to be patterned; a4) etching the base by using the patterned anti-reflective layer and photosensitive layer as a mask; and a5) releasing the patterned anti-reflective layer and photosensitive layer from the base, after the etching.

In step a2), the anti-reflective layer is applied to manufacture a fine pattern during the patterning and the photosensitive layer is applied to serve as the mask of the base.

The anti-reflective coating composition and the photosensitive resin composition may have a general material or composition known in the art.

In step a3), the interference lithography generally uses interference due to a phase difference of a laser emitted from a laser light source and in the interference lithography process of the present invention, a wavelength in the range of 200 to 400 nm may be used.

Step a4), which performs the etching of the base by using the pattern manufactured in step a3) as the mask, may use a dry or wet etching method. An etching composition for etching the base may use $CHF_3$, $CF_4$, $C_4F_8$, or the like and is not necessarily limited thereto.

In step a5), which performs the releasing of the patterned anti-reflective layer and the photosensitive layer from the base after the etching process in step a4), the releasing of the anti-reflective layer and the photosensitive layer is performed by a dry etching process using $O_2$ gas, but is not necessarily limited thereto.

Additionally, in order to produce the base with the pattern in quantity, the base with the pattern may be duplicated by roll printing, roll embossing, hot embossing, UV embossing, or the like. In detail, a master made of a PDMS, PET, PVC, PMMA, or PUA material may be manufactured by using the interference lithography or a master made of a metallic material may be manufactured by depositing and plating a metal thin film on the base with pattern manufactured by using the interference lithography, and the pattern of the master may be transferred on the base. For example, the base with pattern may be easily duplicated by patterning the anti-reflective layer and the photosensitive layer on the base as the master by using a roll printing method such as off-set, gravure, or the like and then performing the etching process.

Step b) is forming the water repellent coating layer on the base with the pattern manufactured during step a). The water repellent coating layer may be formed by coating and drying the water repellent coating composition. The coating of the water repellent coating composition may be performed by a known method in the art, for example, spin coating, deep coating or doctor blading, vapor deposition, and the like, but is not limited thereto.

The drying of the water repellent coating composition may be performed by drying at room temperature for 24 hours after drying at 90 to 120° C. for 1 hour, but the scope of the present invention is not limited thereto.

Further, the present invention provides an optical product including a substrate including a base with the pattern and a water repellent coating layer.

The optical product includes an anti-reflective film, a polarizer compensation film for an LCD, an anti-contamination film for a touch screen, and the like.

Hereinafter, preferable Examples of the present invention will be described. However, the following Examples just exemplify the present invention and the present invention is not limited to the following Examples.

EXAMPLE 1

An anti-reflective layer of 100 nm was formed by spin coating BARC (bottom antireflection coating)(i-con 16 manufactured by Brewer Science Co., Ltd.) on Pyrex glass at 3000 RPM for 30 sec and performing drying at a hot plate at 205° C. for 1 min and thereafter, a photosensitive layer of 200 nm was formed by coating Ultra-i 123 (manufactured by Rohm and Hass Co., Ltd.) which is a photosensitive resin composition. Thereafter, a base with a trapezoid pattern which has a lower line width of 100 nm, an upper line width of 50 nm, and an aspect ratio of 2.5 was exposed, developed, and etched by an interference lithography method using a wavelength of 351.1 nm to be manufactured. Thereafter, a substrate was manufactured by coating a water repellent coating composition including a fluorine-based compound (trade name: OPTOOL) on the base with the pattern, performing drying at 120° C. for 1 hour, and laminating a water repellent coating layer having a thickness 5 nm.

Figure 2:
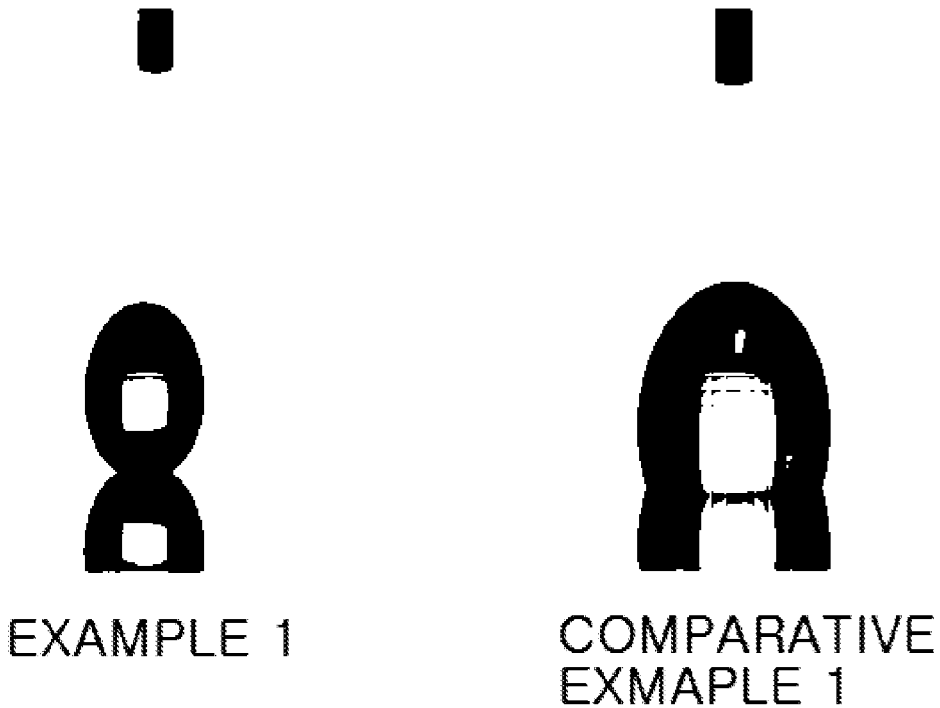
FIG. 2 is a CCD camera photograph illustrating contact angles of substrates of Example 1 and Comparative Example 1.

A shape after ejecting a water droplet of 10 ml on the manufactured substrate by using a syringe was photographed with a CCD camera and shown in FIG. 2. As shown in FIG. 2, it was known that a contact angle was very large, that is, 150° or more.

EXAMPLE 2

The substrate was manufactured in the same manner as Example 1, except that the Pyrex glass in Example 1 was replaced with a polymethyl methacrylate (PMMA) film.

It was checked that the contact angle measured from a photograph photographing the manufactured substrate with a CCD camera was 120° or more.

Figure 3:
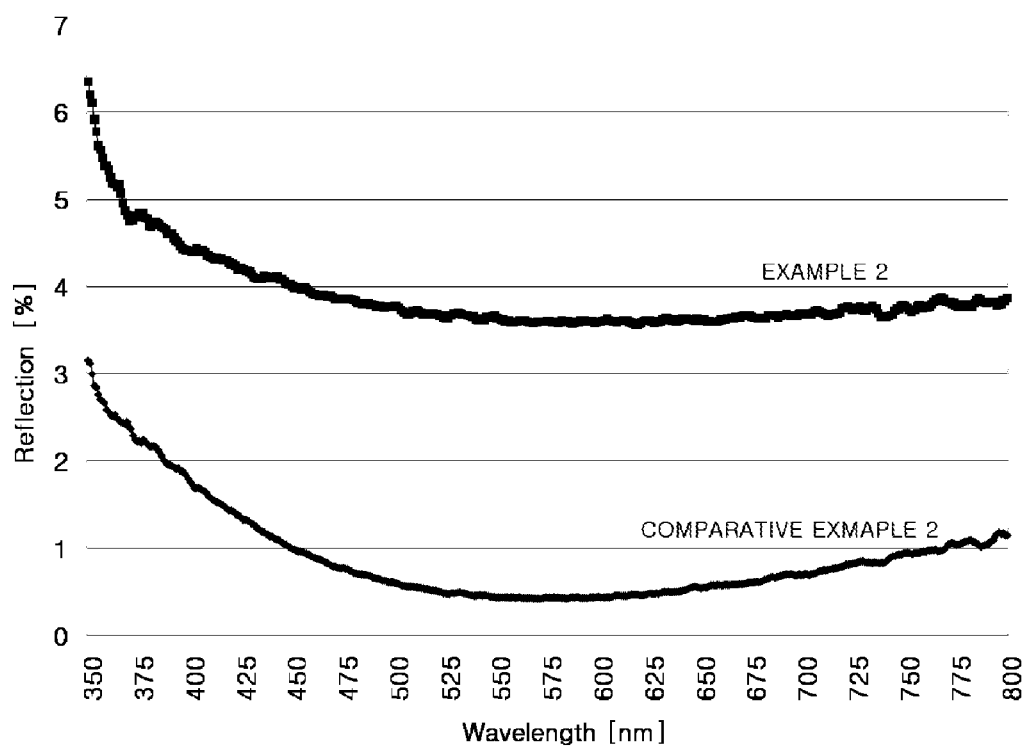
FIG. 3 is a graph illustrating reflection ratio of substrates of Example 2 and Comparative Example 2.

The reflection ratio of the manufactured substrate was measured by using an integrating sphere light transmittance meter and the result was shown in FIG. 3. A horizontal axis of FIG. 3 represented a wavelength in an nm unit and a vertical axis represented reflection ratio in a percentage unit. As shown in FIG. 3, it was known that the substrate manufactured in Example 2 had the reflection ratio of 2% or less.

EXAMPLES 3 to 5

The Pyrex glass in Example 1 was replaced with a polymethyl methacrylate (PMMA) film and a cross-sectional shape of a protruding pattern on the substrate was be formed in a triangle. A pitch of the pattern, that is, a distance between top points of the adjacent patterns was 200 nm and depths of the pattern, that is, vertical distances between the highest point and the lowest point of the pattern was 150 nm (Example 3), 200 nm (Example 4), and 250 nm (Example 5), respectively. Subsequently, the water repellent coating layer was formed in the same manner as Example 1.

Figure 4:
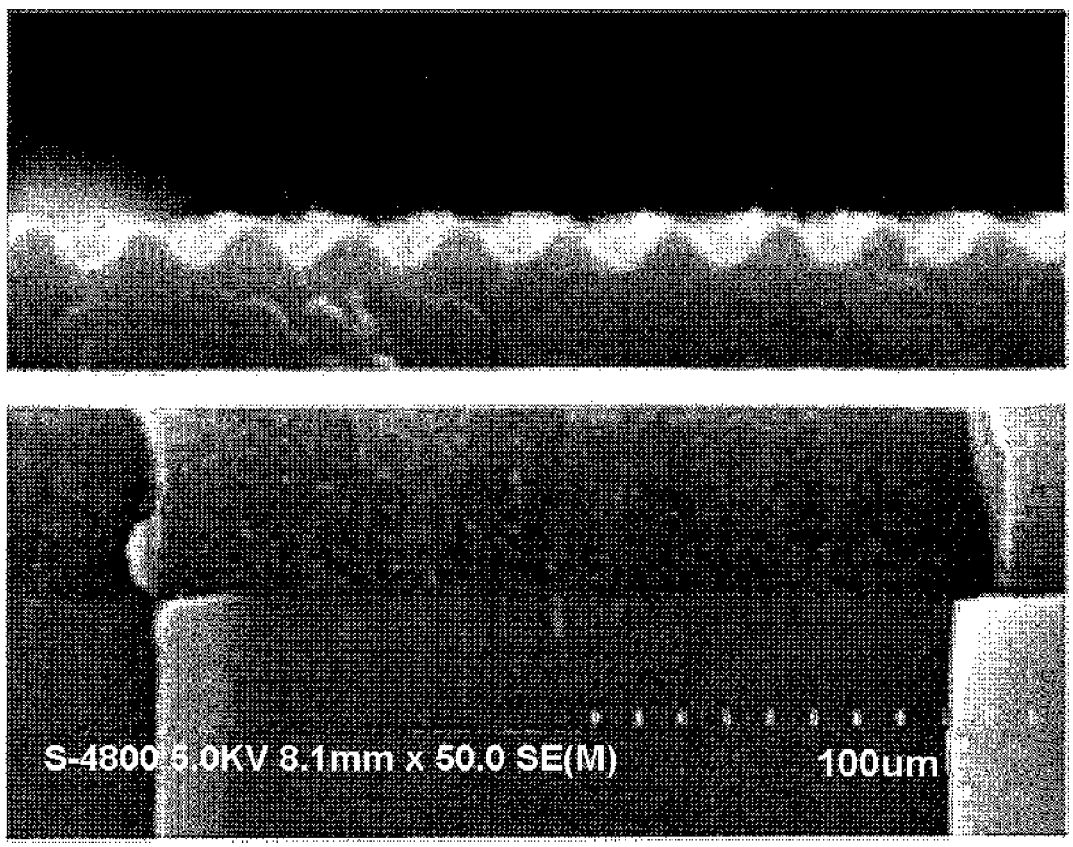
FIG. 4 is a photograph illustrating a pattern formed on a base of a substrate manufactured in Example 3.

An SEM photograph of the surface of the base with the pattern manufactured in Example 3 was shown in FIG. 4. The measured reflection ratio of the substrate manufactured in Examples 3 to 5 was shown in FIG. 5.

COMPARATIVE EXAMPLE 1

A substrate, on which a water repellent coating layer having a thickness 5 nm was laminated, was manufactured by coating a water repellent coating composition including a fluorine-based compound (trade name: OPTOOL) on soda lime glass and performing drying at 120° C. for 1 hour.

A shape after ejecting a water droplet of 10 ml on the manufactured substrate by using a syringe was photographed by a CCD camera and shown in FIG. 2. As shown in FIG. 2, it was known that the contact angle was smaller than that of the substrate in Example 1.

COMPARATIVE EXAMPLE 2

The substrate was manufactured in the same method as Comparative Example 1, except that the soda lime glass in Comparative Example 1 was replaced with a polymethyl methacrylate (PMMA) film.

The reflection ratio of the manufactured substrate was measured by using an integrating sphere light transmittance meter and the result was shown in FIG. 3. As shown in FIG. 3, it was known that the substrate manufactured in Comparative Example 2 had the reflection ratio of about 4.5% in the range of the measure wavelength.

COMPARATIVE EXAMPLES 3 tO 5

For comparison with Example 3, a cross-sectional shape of a protruding pattern on the substrate was formed in a rectangle and depths of the pattern of which a fill factor (a/b) defined in the following figure was 0.5 were 150 nm (Comparative Example 3), 200 nm (Comparative Example 4), and 250 nm (Comparative Example 5), respectively. See FIG. 5. Subsequently, the water repellent coating layer was formed in the same manner as Example 1.

The reflection ratio of the substrate was measured and the measured reflection ratio was shown in FIG. 5.

The invention claimed is:

1. A substrate, comprising:
a base with a pattern on at least one side thereof, in which a refractive index in a lower region of the pattern and a refractive index in an upper region of the pattern are different from each other according to a shape of the pattern; and
a water repellent coating layer provided on the at least one side with the pattern of the base,
wherein the pattern on the base is directly formed by an interference lithography method, and
wherein the substrate is for a polarizer compensation film for a liquid crystal display, or an anti-contamination film for a touch screen.

2. The substrate according to claim 1, wherein the refractive index in the lower region is the same as a reflective index of the base.

3. The substrate according to claim 1, wherein the refractive index in the upper region is smaller than the refractive index in the lower region of the pattern of the base.

4. The substrate according to claim 1, wherein the pattern on the base has a form in which a width of the upper region of the pattern is smaller than the width of the lower region of the pattern in at least one vertical cross-section of the pattern.

5. The substrate according to claim 1, wherein a horizontal cross section of the pattern on the base becomes smaller toward the upper region of the pattern.

6. The substrate according to claim 1, wherein the pattern on the base has at least one vertical cross-section of the pattern which is a form of one- or two-dimensional triangle, sine wave, or trapezoid.

7. The substrate according to claim 1, wherein the pattern on the base has a line width of 50 to 300 nm and a depth of 100 nm or more.

8. The substrate according to claim 1, wherein the base includes quartz glass, Pyrex glass, soda lime glass, blue glass, a cellulose triacetate film, a norbornene-based cycloolefin polymer film, a polyester film, a polymethacrylate film, a polycarbonate film, or a polymethyl methacrylate (PMMA) film.

9. The substrate according to claim 1, wherein the water repellent coating layer is formed from one or more of water repellent agents selected from fluorine-based water repellent agents and silane-based water repellent agents.

10. The substrate according to claim 1, wherein the substrate has light transmittance of less than 2% and a contact angle of the water repellent coating layer and the at least one side of the base of 120° or more.

11. A manufacturing method of the substrate of claim 1, comprising:
a) forming the pattern having the shape so that the refractive index in a lower region of the pattern and the refractive index in an upper region of the pattern are different from each other, on the at least one side of the base; and
b) forming the water repellent coating layer on the at least one side with the pattern of the base,
wherein the pattern on the base is directly formed by the interference lithography method, and
wherein the substrate is for a polarizer compensation film for a liquid crystal display, or an anti-contamination film for a touch screen.

12. The manufacturing method of the substrate according to claim 11, wherein a wavelength in a range of 200 to 400 nm is used in the interference lithography method.

13. The manufacturing method of the substrate according to claim 11, wherein step a) is performed by manufacturing a master with the pattern by using the interference lithography method or manufacturing a master made of a metallic material by depositing and plating a metal thin film on the base with the pattern manufactured by using the interference lithography method, and then transferring the pattern of the master on the base.

14. The manufacturing method of the substrate according to claim 11, wherein step b) includes coating the water repellent coating layer and drying the water repellent coating layer.

15. An optical product including the substrate of claim 1, wherein the substrate is for a polarizer compensation film for a liquid crystal display, or an anti-contamination film for a touch screen.

16. A substrate, comprising:
a base with a pattern on least one side thereof; and a water repellent coating layer provided on at least one side of the base,
wherein the substrate has light transmittance of less than 2% and a contact angle of the water repellent coating layer and the at least one side of the base of 120° or more,
wherein the pattern on the base is directly formed by an interference lithography method, and
wherein the substrate is for a polarizer compensation film for a liquid crystal display, or an anti-contamination film for a touch screen.

* * * * *